Nov. 7, 1967    J. G. HAGERBORG    3,350,837
TOOL ACTUATING MECHANISM
Original Filed Aug. 10, 1962    6 Sheets-Sheet 2
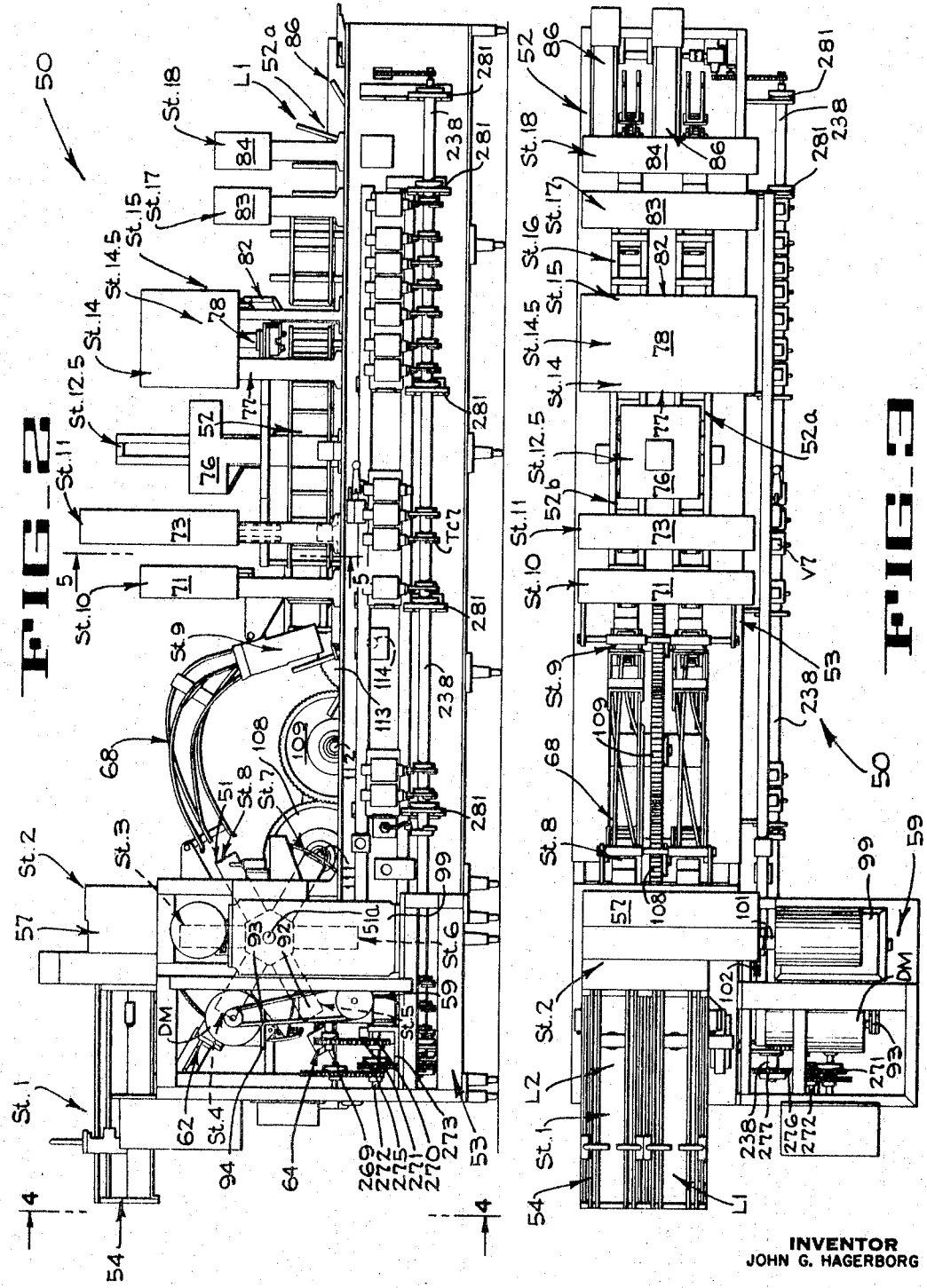
INVENTOR
JOHN G. HAGERBORG
BY F. W. Anderson
ATTORNEY

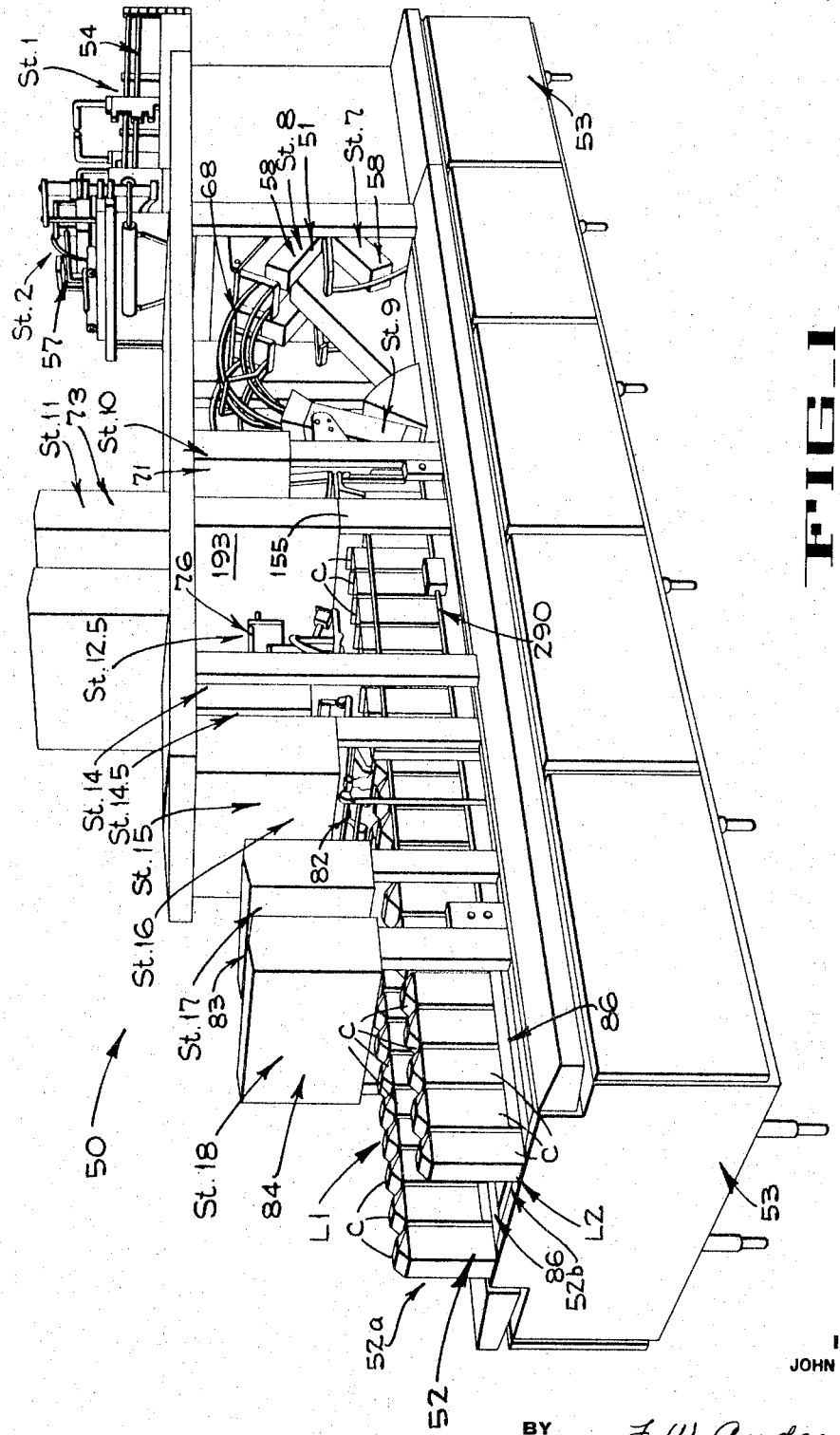

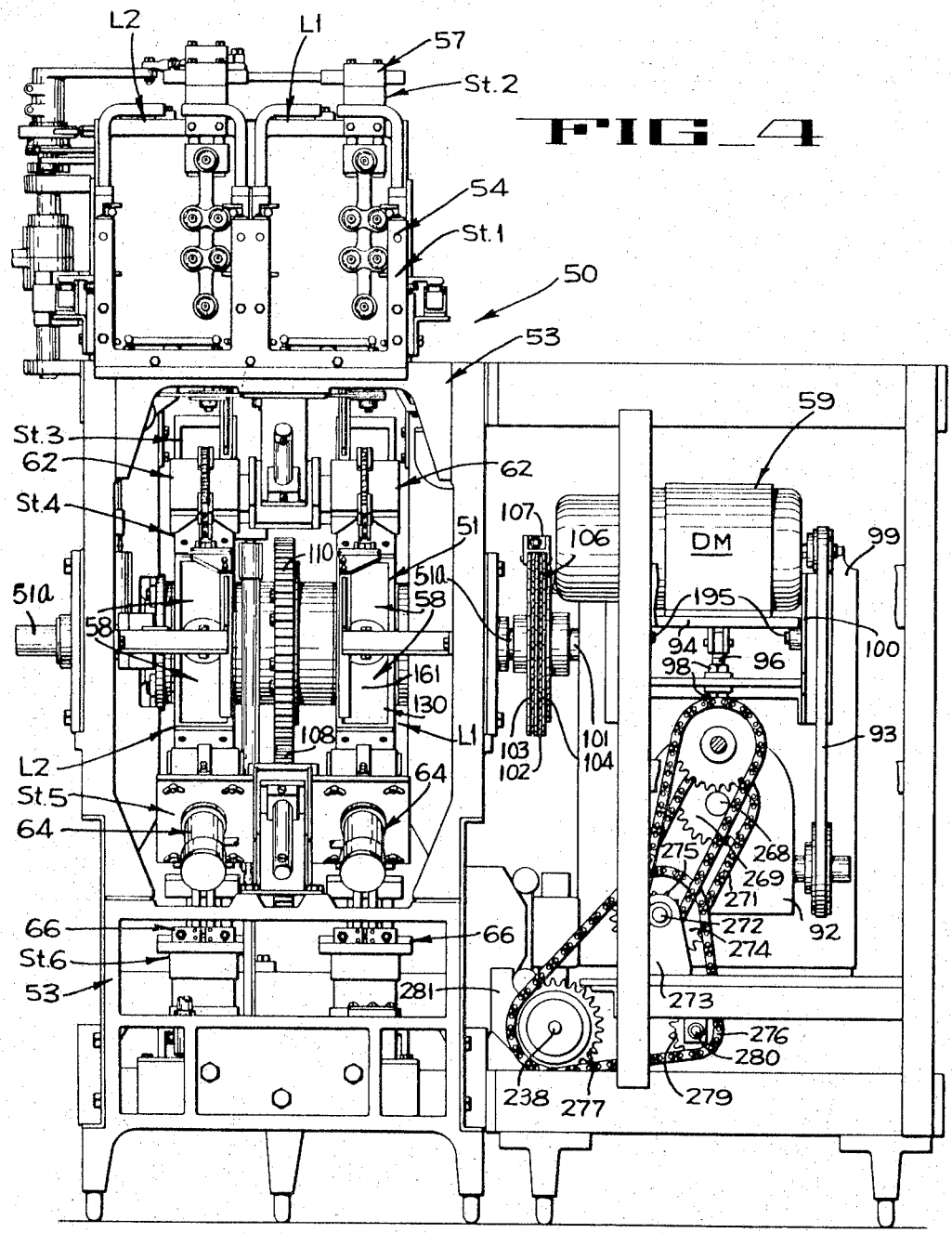

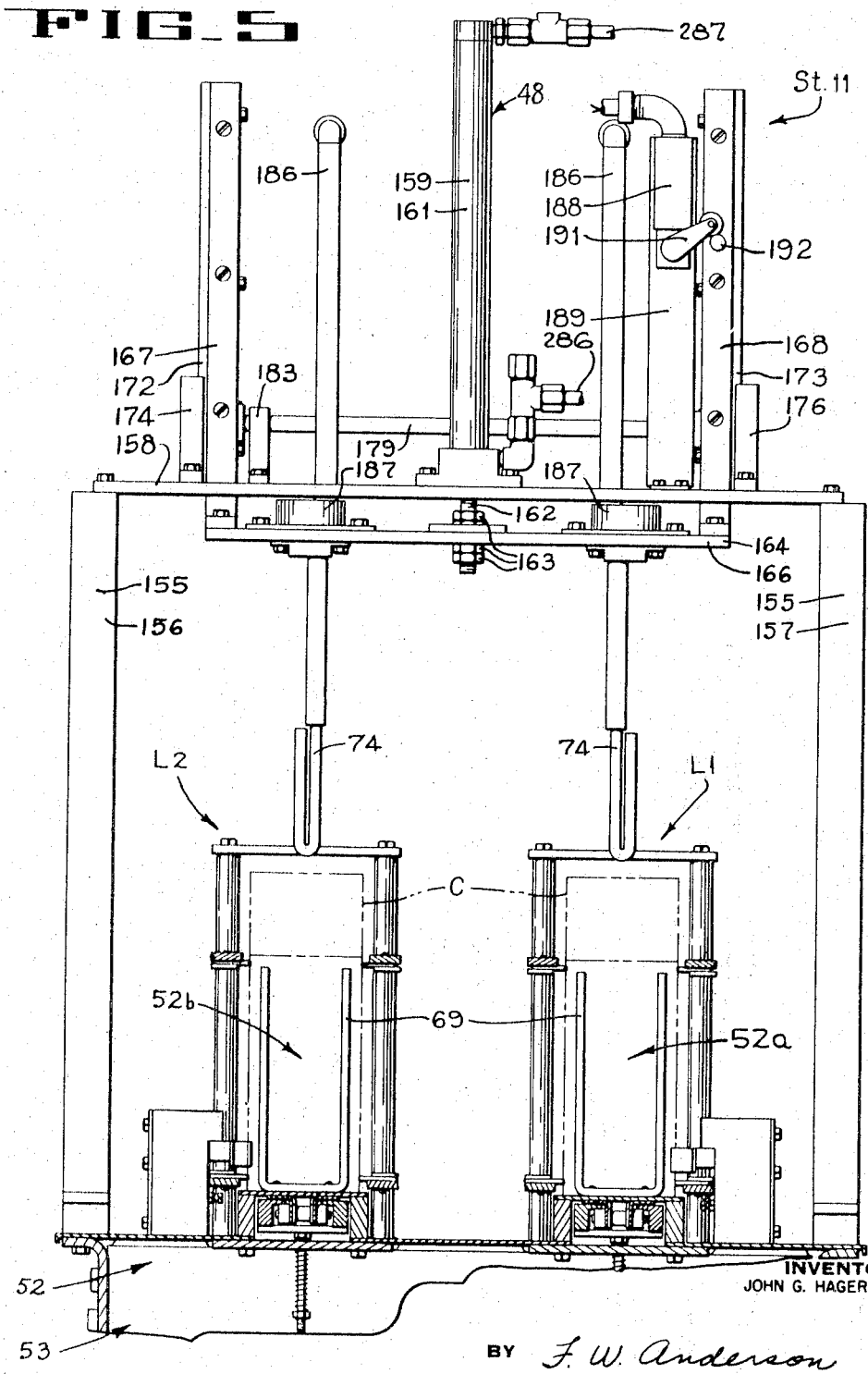

Nov. 7, 1967  J. G. HAGERBORG  3,350,837
TOOL ACTUATING MECHANISM
Original Filed Aug. 10, 1962  6 Sheets-Sheet 5
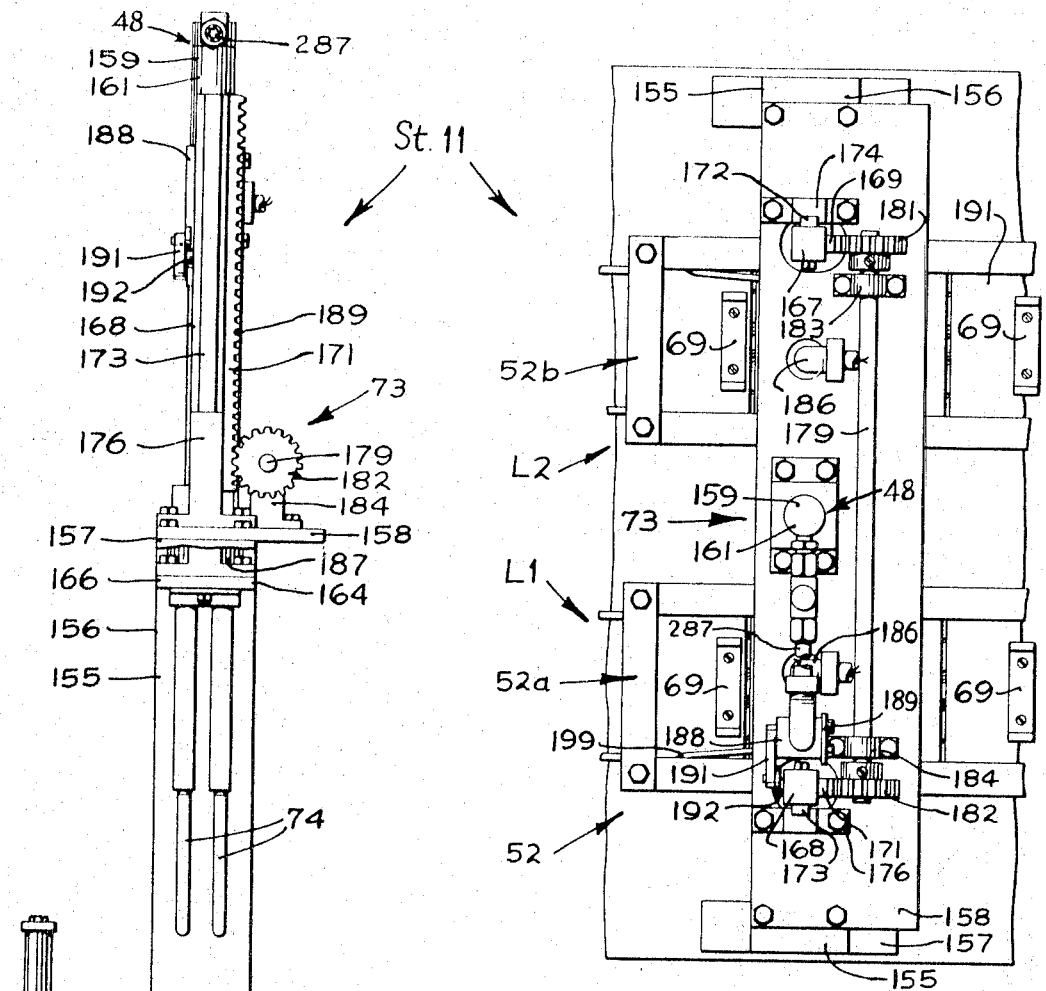
FIG_6
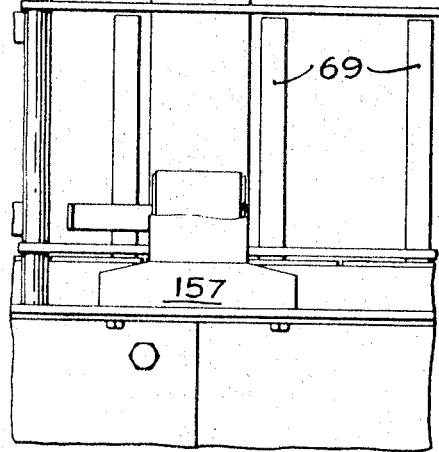
FIG_7
INVENTOR
JOHN G. HAGERBORG
BY F. W. Anderson
ATTORNEY

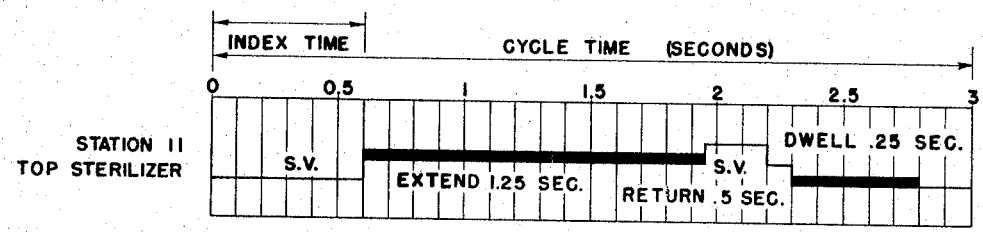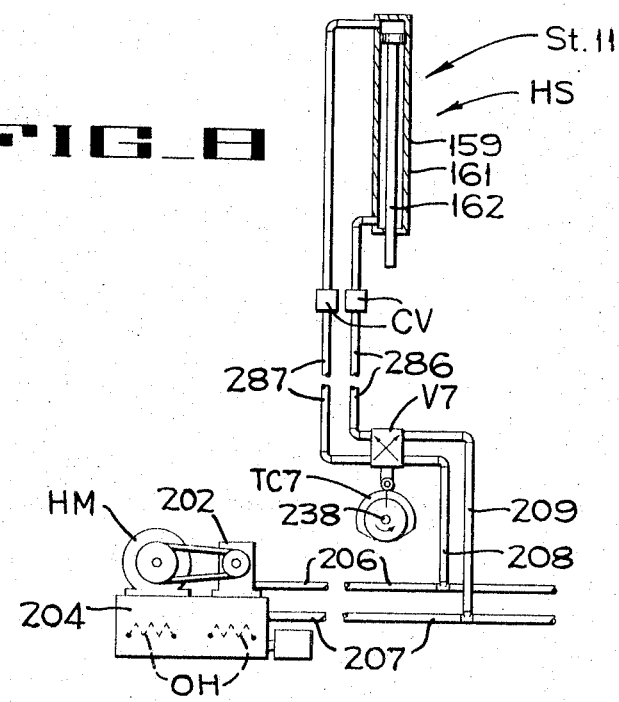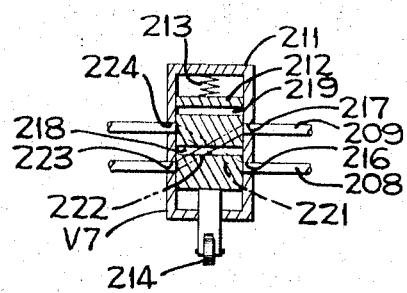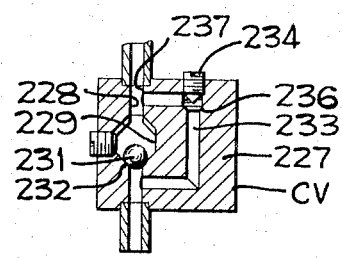

United States Patent Office 3,350,837
Patented Nov. 7, 1967

3,350,837
TOOL ACTUATING MECHANISM
John G. Hagerborg, St. Niklaas-Waas, Belgium, assignor to FMC Corporation, San Jose, Calif., a corporation of Delaware
Original application Aug. 10, 1962, Ser. No. 216,248, now Patent No. 3,248,841, dated May 3, 1966. Divided and this application Feb. 11, 1966, Ser. No. 526,729
2 Claims. (Cl. 53—77)

ABSTRACT OF THE DISCLOSURE

A horizontally elongate tool carrier is vertically reciprocated by a single ram to position any array of tools supported by the carrier adjacent workpieces on a subjacent conveyor. The carrier has racks which are engaged by pinions on a fixed rotatable shaft to assure equal movement of both ends of the carrier, and has guide members slidable in fixed guide blocks to assure linear movement of the carrier. Means are provided for deactivating the ram if the tools are reciprocated thereby less than a predetermined distance.

---

This application is a division of our copending application Ser. No. 216,248, which application was filed on Aug. 10, 1962, and is now U.S. Patent No. 3,248,841.

The present invention pertains to packaging equipment and more particularly relates to an actuating mechanism for accurately moving a tool into and out of registration with a container intermittently registered therewith.

One object of the present invention is to provide a tool actuating mechanism capable of accurately aligning and moving a tool into or out of registration with a carton being processed.

Another object is to provide a tool actuating mechanism capable of maintaining a plurality of widely spaced tools in exact alignment with cartons positioned therebelow.

These and other objects and advantages of the present invention will become apparent from the following description and accompanying drawings, in which:

FIGURE 1 is a persepective of a carton forming and filling machine of which the tool actuating mechanism of the present invention is a part, the view being taken looking at the elongated left side and the relatively narrow rear end of the machine.

FIGURE 2 is a diagrammatic elevation of the right side of the carton forming and filling machine, certain protective housing being removed.

FIGURE 3 is a diagrammatic plan of the machine of FIGURE 2.

FIGURE 4 is a diagrammatic front elevation of the machine of FIGURE 2, taken looking in the direction of arrows 4—4 of FIGURE 2.

FIGURE 5 is an enlarged vertical section taken along lines 5—5 of FIGURE 2 showing the tool actuating mechanism of the present invention associated with the sterilizing apparatus.

FIGURE 6 is a plan of the tool actuating mechanism of FIGURE 5.

FIGURE 7 is a side elevation with parts broken away of the tool actuating mechanism illustrated in FIGURE 5.

FIGURE 8 is a diagrammatic elevation illustrating that portion of the hydraulic system used for the tool actuating mechanism of the sterilizing apparatus.

FIGURE 9 is a central section through one of several four-way hydraulic valves used in the hydraulic system.

FIGURE 10 is a central section through one of the speed control valves in the hydraulic system.

FIGURE 11 is a chart illustrating the timing of the hydraulic power unit used in the hydraulic system of the sterilizing apparatus.

General description

Although the carton forming and filling machine 50 (FIGS. 1 to 4) with which the tool actuating mechanism 48 (FIGS. 5–7) is associated will be shown and described as a machine for packaging milk in half gallon cartons C, it will be understood that it is within the scope of the present invention to fill other liquids into either half gallon or other size cartons. Because of the numerous operations performed on the cartons as they pass through the machine, the different sections of the machine at which successive operations on the carton are carried out will be identified as consecutively numbered stations St. 1 through St. 18.

As best shown in FIG. 3, the illustrated embodiment of the machine has two processing lines L1 and L2, each of which processes cartons at the rate of twenty cartons per minute. In the description to follow, when parts associated with the lines L1 and L2 are identical, only those parts associated with one of the lines will be described in detail. It is to be understood that it is within the scope of the invention to provide as many lines as needed to achieve the desired rate of discharge.

The carton forming and filling machine 50 has two main sections: a carton erecting section which is disposed at the front or left hand end of the machine (FIGS. 2 and 3) and includes stations St. 1–St. 8, and a carton filling and closed section which includes stations St. 9–St. 18. In general, between stations St. 1 and St. 8 a carton is erected and placed on a turret 51 and its bottom is closed and sealed. In the carton filling and closing section, a conveyor assembly 52 is mounted on a frame 53 and includes two endless chain, carton supporting conveyors 52a and 52b (FIG. 3) which advance the cartons along the lines L1 and L2, respectively. A magazine 54 at station 1 is mounted on the frame 53 and is arranged to receive a stack of tubular carton blanks 56 (FIG. 5) in flat folded form. In the magazine, the blanks are held in upright position extending transversely of the magazine with the end of the blank, which forms the top of the carton when it is erected, disposed lowermost in the magazine. The magazine 54 includes means for urging the carton blanks 56 rearwardly in the machine toward a carton erecting and turret loading apparatus 57 (FIG. 2) at station 2. This erecting and loading apparatus 57 removes one carton blank at a time from the magazine, for each line, squares each carton blank into an open ended rectangular tube, and moves each of the squared tubular carton blanks downwardly at station 3 over one of six carton forming mandrels 58 in the associated processing line which are carried by and are evenly spaced around the turret 51.

The turret 51 and conveyors 52a and 52b are intermittently driven by a drive mechanism 59 which is timed so as to require approximately six-tenths of a second for each increment of movement and to allow each carton to remain at each station for approximately two and four-tenths seconds. As shown in FIG. 2, intermittent indexing of the turret 51 advances the cartons along an arcuate counterclockwise path from station 3 to station 8 during which time operations are performed on the bottom of the cartons, and intermittent movement of the conveyors 52a and 52b advances the cartons along a linear path from station 9 to station 18 during which time operations are performed on or are associated with the tops of the cartons. It will be understood that the drive mechanism 59 drives the turret 51 so that each indexing motion of drive 59 advances each mandrel 58 from one station to the next, however, each indexing motion only advances the conveyors 52a and 52b in half-station increments and therefore cartons on conveyors 52a and 52b will come to rest between stations.

When a carton is positioned at station 4, a bottom forming apparatus 62 is actuated to force a bottom forming die 63 against the lower end flaps of the carton thereby causing the end flaps to bend at their score lines as shown in FIG. 8A. At station 5, a bottom heating apparatus 64 (FIG. 2) is placed into operation and directs hot air at only those surfaces of the bottom flaps which will subsequently be sealed together by a bottom sealing apparatus 66 (FIG. 4) at station 6. The carton with its bottom flaps sealed together at station 6 is then moved past station 7 (FIG. 2) which is a vacant station, and into station 8 at which time high pressure air is directed against the interior face of the bottom wall of the carton through the associated mandrel 58 to eject the carton from the mandrel.

The ejected carton C is guided by a carton transfer and turning mechanism 68 which moves the carton from the inverted to an upright position while at the same time turning the carton 90° about its longitudinal axis. The so-turned carton is received at station 9 between two adjacent drive lugs 69 of the associated conveyors 52a and 52b.

While at station 10, a top forming apparatus 71 moves a top forming head 72 downwardly against the upper flaps of the carton to bend these flaps along the score lines so that the upper end of the carton assumes the position shown in FIG. 9A. The carton is then indexed to Station 11 where a sterilizing apparatus 73 moves an ultraviolet light 74 into the carton to thoroughly sterilize the interior of the carton. After the carton has been sterilized, it is moved to station 12.5 where a carton filling apparatus 76 fills the carton with milk. The filled carton is then moved to station 14 under a top sizing apparatus 77 which operates to bend additional portions of the top closure into the proper position for heating.

The carton is then moved by the associated conveyor 52a or 52b into station 14.5 where a top heating apparatus 78 lowers a heating head 79 over the top flaps of the carton, which head 79 is formed so as to direct hot air only at those surfaces of the top flaps which are to be pressed together to seal the top of the carton. After the top flap surfaces have been properly heated, the associated conveyor indexes the carton to station 15 where a top sealing apparatus 82 forces the heated surfaces of the flaps together to seal the top of the carton.

The conveyor then advances the filled carton to station 16, which is a vacant station where sample cartons may be removed from the conveyor for testing if desired. When the carton is moved to station 17, a top stamping apparatus 83 impresses suitable identifying indicia thereon. The filled, sealed, and marked carton is finally advanced to station 18 where it is moved laterally off the conveyor by a discharge apparatus 84 onto one of two high speed discharge conveyors 86 which are parallel to conveyors 52a and 52b and discharges the carton from the carton forming and filling machine 50 of the present invention.

*Turret and conveyor drive mechanism.*—As mentioned previously, the turret 51 and conveyors 52a and 52b are driven intermittently, each movement of the turret moving a carton from one station to the next, while each indexing movement of the conveyors advances cartons thereon only one-half the normal distance between the stations along the conveyors. The length of each indexing movement of the conveyors will be referred to hereinafter as a half-station increment. The drive mechanism 59 (FIGS. 2, 3 and 4) is so timed that approximately six-tenths of a second is required for each intermittent movement, and the cartons remain in each station or between stations along conveyors 52a and 52b, for approximately two and one half seconds.

The drive mechanism 59 (FIGS. 2, 3 and 4) comprises a drive motor DM which is connected to a gear reducer 92 by a belt drive 93. The motor DM is mounted on a plate 94 (FIG. 4) which is pivoted at its rearward end on a pair of stubshafts 95 projecting from a fixed bracket 100, and has its forward end supported for vertical adjustment by a bolt 96 which is pivoted to the motor plate 94 and extends through a horizontal plate portion of the bracket and is locked in adjustable position by nuts 98. One output shaft (not shown) of the gear reducer 92 is coupled to a Ferguson drive 99 which drives its output shaft 101 intermittently.

The output shaft 101 is coupled to the turret shaft 51a by a coupling 102. The coupling 102 comprises identical axially aligned sprockets 103 and 104 which are keyed to the shafts 51a and 101, respectively, and have a double chain 106 trained therearound. A connector 107 is used to clamp the ends of the chain 106 together, with the chain fitted firmly around the sprockets 103 and 104.

The conveyors 52a and 52b are accurately timed with the turret and are partially driven directly from the turret 51 by a gear 110 which is keyed to the shaft 51a.

The gear 110 meshes with a first idler gear 108 which, in turn, meshes with a second idler gear 109. The idler gears 108 and 109 are journalled on stub shafts 111 and 112, respectively, which are secured to the frame 53 of the machine. The second idler gear 109 meshes with a conveyor drive gear 113 which is keyed to a conveyor drive shaft 114. The shaft 114 (FIG. 2) is journalled on the frame 53. Thus, the conveyors 52a and 52b are intermittently driven to the right (FIGS. 2 and 3) in timed relation with the movement of the turret 51.

The tool actuating mechanism 48 of the present invention is used at stations St. 10, St. 11, St. 14 and St. 14.5 to control the movement of the processing tools at the associated stations into registration with the cartons disposed therebelow. Since the tool actuating mechanisms at the several processing stations mentioned immediately above are substantially the same, only the tool actuating mechanism 48 at the sterilizing station will be described in detail.

*Sterilizing apparatus.*—After being preformed at station 10, the cartons in lines L1 and L2 are indexed at station 11 at which station the interiors of the cartons are sterilized by the ultra-violet lights 74 (FIGS. 5, 6 and 7) of the sterilizing apparatus 73.

The sterilizing apparatus 73 comprises a support structure 155 which includes a pair of pedestals 156 and 157 having a bridge plate 158 extending between and bolted to the upper ends of the pedestals. The lower ends of the pedestals 156 and 157 are bolted to the vertical side plates of the frame 53. A hydraulic power unit 159 of the tool actuating mechanism 48 of the present invention has its cylinder 161 bolted to the bridge plate 158 with its piston rod 162 projecting downward through a hole in the bridge plate. The piston rod 62 is connected by nuts 163 to a horizontal mounting plate 164 of a carrier 166 which carrier includes a pair of upstanding arms 17 and 168 to which racks 169 and 171 (FIG. 6), respectively, are secured. The arms 167 and 168 are bolted to the ends of the plate 164, project through openings in the bridge plate 158, and have elongated keys 172 and 173 bolted thereto. The carrier 166 is guided for vertical movement by vertically slotted slide blocks 174 and 176 which are bolted to the bridge plate 158 and are slidably engaged by the keys 172 and 173, respectively.

In order to maintain the mounting plate 164 of the carrier 166 horizontal, a stabilizing shaft 179 having pinions 181 and 182 keyed thereon is journalled in bearings 183 and 184 that are bolted to the bridge plate 158. The pinions 181 and 182 mesh with the racks 169 and 171, respectively, and assure that the ends of the plate 164 move equal distances during movement of the carrier 166.

A pair of the ultraviolet lights 74 are inserted into each carton indexed at station 11 upon downward movement of the carrier 166 and are moved to within approximately one-half inch of the bottom of the carton. The ultraviolet lights 74 are bolted to the carrier 166 and are connected to a high voltage source of electricity through leads which are disposed within conduits 186. A photoelectric burn-out detector 187 is electrically connected with each pair of lights 74 and is positioned to scan the associated pair of ultraviolet lights 74. In the event a light should break or burn out, the associated photoelectric burn-out detector 187 opens the circuit to the drive motor DM (FIG. 2) thereby stopping the machine 50.

A normally closed limit switch 188 is mounted on a bracket 189 bolted to the bridge plate 158 and includes an actuating arm 191 positioned to engage a pin 192 projecting outwardly from the arm 168 when the carrier 166 is in its uppermost position and the ultraviolet lights 74 are above the path of movement of the cartons. Opening of the limit switch 188 permits the energization of the drive motor DM and movement of the conveyors 52a and 52b to the next indexed position. If the switch is not opened upon termination of upward movement of the carrier 166, indicating that the bottom of the ultraviolet lights 74 lie in the path of movement of the cartons, a circuit is closed which prevents energization of the motor DM.

During normal operation, the lights 74 are on at all times, being shielded from the operator's eyes when in the elevated position by a sheet metal closure 193 (FIG. 1) and being shielded from the operator's eyes when in the lower position by the walls of the carton.

In the operation of the sterilizing apparatus 73 (FIGS. 5, 6 and 7) the hydraulic power cylinder 159 is actuated to move the pairs of ultraviolet lights 74 downward and into the associated carton C therebelow immediately after these cartons have been indexed at station 11. The high intensity ultraviolet lights completely sterilize the interior of the associated cartons and are then withdrawn from the cartons. The sterilized cartons are then moved away from station 11 and new cartons are moved into station 11 at which time the cycle of operation is repeated.

The conveyors 52a and 52b are intermittently driven at a constant rate unless one of the ultraviolet lights 74 is broken or burned out in which case the associated photoelectric detector 187 opens the circuit to the drive motor DM (FIG. 2) thereby stopping the conveyors 52a and 52b. The conveyors are also stopped in the event the carrier 166 is not raised to a position wherein the switch 188 is opened indicating that the lights 74 are positioned above the path of movement of the cartons.

The hydraulic circuit which controls the operation of the sterilizing apparatus 73 will now be described in detail.

*Hydraulic system.*—The hydraulic power cylinder 159 is incorporated in a hydraulic system HS (FIG. 8). The actuation of the hydraulic cylinder 159 is timed relative to the intermittent movement of conveyors 52a and 52b (FIGS. 2 and 3) by a timing cam TC7 which operates a four-way hydraulic valve V7. The rate of movement of the piston rod 162 of the power cylinder 159 is controlled during extension and retraction by two speed control valves CV, one valve being placed in each conduit connected to the associated ends of the power cylinder 159 to permit free entry of the hydraulic fluid into the cylinder to restrict to a predetermined rate the discharge of fluid therefrom.

As diagrammatically illustrated in FIG. 8, the hydraulic system HS comprises a hydraulic pump 202 which is continuously driven by a motor HM. The pump 202 receives fluid from a sump 204 and discharges high pressure fluid through a manifold 206. The low pressure fluid is returned to the sump 204 from the power cylinder through a manifold 207. Both the high pressure manifold 206 and the low pressure manifold 207 extend the full length of the machine so that the valve V7 can easily be connected thereto by high pressure conduits 208 and return conduits 209, respectively. A plurality of oil heaters OH are provided in the sump 204 and are controlled so as to maintain the temperature of the hydraulic fluid between 105° F. to 140° F.

As diagrammatically illustrated in FIGURE 9, the valve V7 includes a housing 211 having a shiftable core 212 therein. A spring 213 disposed between the core and the housing normally urges a cam follower 214 journalled on one end of the core against the associated timing cam TC7. The associated high pressure conduit 208 and return conduit 209, are connected to ports 216 and 217, respectively, in the housing 211. The port 216 communicates either with a straight line passage 218 extending centrally through the core 212, or with a slanted or cross passage 221 which extends along the periphery of the cylindrical core. Similarly, the port 217 communicates either with a straight passage 219 or with a slanted passage 222 that is formed in the periphery of the core 212 on the opposite side of the core from the peripheral passage 221. With this arrangement the hydraulic fluid can be selectively directed to discharge port 223 or 224 in the housing 211. It will be understood that each passage 218, 219, 221 and 222 are independent passages and do not communicate with each other.

The several speed control valves CV (FIG. 10) are identical in construction and accordingly the description of one will suffice for all. Each speed control valve CV (FIG. 10) comprises a housing 227 having a straight line passage 228 therethrough. An enlarged portion 229 of the passage 228 has a ball check valve 231 therein which rests against a seat 232 to prevent flow of fluid downwardly (FIG. 10) through the passage 228 but permits unrestricted flow upwardly (FIG. 10) through the passage 228. A U-shaped control passage 233 in the housing 227 bypasses the ball valve 231 and communicates with opposite ends of the straight line passage 228. An adjustable needle valve 234 cooperates with a frusto-conical seat 236 in the control passage to restrict downward (FIG. 10) flow of fluid therethrough to thereby control the rate of travel of the piston of the associated power cylinder. It will be understood that the needle valve 234 of each speed control valve CV will be adjusted so as to achieve the desired rate of travel of the piston 162 of the associated power cylinder 159. It will also be understood that the speed control valves CV are all positioned so that the upper port 237, rather than the lower port, is connected to the associated power cylinder.

In order to accurately time the operation of the sterilizing apparatus 73 with the turret 51 and conveyors 52a and 52b, the timing cam TC7 is keyed to a cam shaft 238 (FIGS. 1–4) which extends the full length of the machine. A second output shaft 268 (FIG. 4) of the previously described gear reducer 92 has a sprocket 269 keyed thereon which is connected to a driven sprocket 270 (FIG. 2) by a chain 271. The driven sprocket 270 is keyed on an idler shaft 272 which is journalled in a bracket 273 bolted to the frame 53. A large diameter cam shaft drive sprocket 274 is keyed to the idler shaft 272. A chain 276 (FIG. 4) is trained around the large diameter sprocket 274, around a sprocket 277 keyed to the cam shaft 238, and around an idler sprocket 279 that is journalled on a shaft 280 secured to the frame 53. The cam shaft 238 extends the full length of the machine 50 (FIG. 2) and is journalled in spaced brackets 281 secured to the frame 53. The timing cam TC7, as well as a plurality of similar timing cams, are secured at spaced intervals along the cam shaft 238. The cam TC7 controls the actuation of the power unit 159 of the sterilizing apparatus 73.

The control of the hydraulic power cylinder 159 at station 11 will now be described in detail having reference to FIGURES 8 and 11.

In regard to the chart shown in FIGURE 11, it will be understood that the darkened area indicates the time required for the piston rod 162 of the associated piston to move from the extended to the retracted positions or from the retracted to the extended positions and that the pressure will be applied to the same side of the piston in a dwell period after movement is completed until the associated cam TC7 shifts the valve V7 to its other position. The lines marked S.V. correspond to the sloping portions of the associated cam TC7 which shifts the valve V7 between the cross-passage position and the straight passage position. The time required for the valve V7 to shift from one position to the other will not be included in the description to follow but, as shown in FIGURE 12, each shifting of the valve requires approximately 0.1 second. In the description to follow, it will be understood that the term "cross-passage position" indicates the position at which the passages 221 and 222 register with the conduits 208 and 209, and the term "straight passage position" indicates the position in which the passages 218 and 219 register with the conduits 208 and 209.

As indicated at the top of FIGURE 11, the conveyor and turret indexing operation takes place in the first 0.6 second of the three second operating cycle, and the remaining time is utilized for performing the sterilizing operation while a carton is indexed at station 11 in position to be sterilized.

At station 11 the piston rod 162 is moved downwardly out of the cylinder 159 to move the sterilizing lights down into the cartons and is then retracted upwardly. The cylinder 195 at station 11 is connected to the valve V7 by conduits 286 and 287 having speed control valves CV therein. The piston rod 162 in cylinder 159 is held in the retracted position for approximately 0.6 second after the start of a cycle of operation by the cam TC7 which holds the valve V7 in the cross-passage position. The cam TC7 then shifts the valve V7 to the straight line position and the speed control valve CV and the conduit 286 controls the flow rate so that the piston rod 162 is moved to its extended position in approximately 1.25 seconds. The piston rod is maintained in this position for approximately 0.25 second and thereafter the cam TC7 returns the valve V7 to the cross-passage position. The speed control valve CV in the conduit 287 then restricts the rate of movement of the piston rod so that the piston rod reaches its retraced position in 0.5 second. The piston rod 162 is maintained in this position until the cycle is completed.

From the foregoing description it is apparent that the tool actuating mechanism of the present invention is adapted to reciprocate an elongated tool carrier and to assure that both ends thereof move equal amounts. Thus, the tool actuating mechanism assures a smooth, accurate reciprocal movement of the tools and eliminates all tendencies of one end of the elongated carrier to move greater distances than the other end of the carrier which would result in binding and improper registration of the associated tool with the associated carton.

While one embodiment of the present invention has been shown as described, it will be understood that various changes and modifications may be made without departing from the spirit of the invention or the scope of the appended claims.

The present invention and manner in which the same is to be used having thus been described, what is claimed as new and desired to be protected by Letters Patent is:

1. In a machine for forming, filling and closing a carton the combination of a pair of widely spaced pedestals, a bridge plate secured to the upper end of said pedestals and extending therebetween, a pair of spaced slide blocks each having a vertical slot therein secured to said bridge plate, a centrally positioned hydraulic cylinder secured to said bridge plate, said cylinder having a piston rod projecting below said bridge plate, an elongate tool carrier connected to said piston rod, a pair of arms secured to opposite ends of said carrier with each arm being positioned closely adjacent an associated one of said slide blocks, a key secured to each arm and slidably received in the associated slide block, a rack secured to each of said arms, a shaft supported for rotation by said bridge plate and extending transversely of said racks, and a pair of pinions keyed to said shaft with each pinion in engagement with an associated one of said racks to assure equal movement of both ends of said carrier upon actuation of said hydraulic cylinder.

2. A tool actuating mechanism comprising support means, a hydraulically operated ram carried by said support means and having a projecting reciprocable piston rod, a tool carrier connected to said piston rod, a pair of arms secured to said carrier, a follower secured to each arm, a guide slidably receiving each follower and secured to said support means, a rack secured to each of said arms, a shaft supported for rotation by said support means and extending transversely of said racks, a pinion engaged with each rack and keyed to said shaft, a conveyor disposed below said tool carrier for supporting a plurality of cartons, power means for intermittently driving said conveyor to index successive cartons below said tool carrier, a tool carried by said tool carrier, means operatively associated with said ram and said power means for causing said ram to reciprocate said tool a predetermined distance relative to a carton indexed therewith, means for controlling the operating speed of said ram, and means for deactivating said power means in the event said tool is reciprocated a distance less than said predetermined distance.

References Cited
UNITED STATES PATENTS

| | | | |
|---|---|---|---|
| 1,289,752 | 12/1918 | Hawkins | 74—29 X |
| 2,931,148 | 4/1960 | Smith | 53—28 |

TRAVIS S. McGEHEE, *Primary Examiner.*

R. J. ALVEY, *Assistant Examiner.*